US 010784947B2

(12) United States Patent
Tang et al.

(10) Patent No.: US 10,784,947 B2
(45) Date of Patent: Sep. 22, 2020

(54) METHODS OF BEAM MANAGEMENT AND BEAM SELECTION BASED ON MEASUREMENT REPORTING IN NEW RADIO (NR) SYSTEMS

(71) Applicant: Apple Inc., Cupertino, CA (US)

(72) Inventors: Yang Tang, Plesanton, CA (US); Shuang Tian, Santa Clara, CA (US); Andrey Chervyakov, Nizhny Novgorod (RU); Jie Cui, Santa Clara, CA (US); Hua Li, Arlington, VA (US); Dmitry Belov, Nizhny Novgorod (RU); Carlos Cordeiro, Portland, OR (US); Geng Wu, Portland, OR (US); Jeongho Jeon, San Jose, CA (US); Puneet Jain, Hillsboro, OR (US); Qian Li, Beaverton, OR (US); Youn Hyoung Heo, Seoul (KR); Anthony Lee, San Diego, CA (US); Seau S. Lim, Swindon (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/379,047

(22) Filed: Apr. 9, 2019

(65) Prior Publication Data

US 2019/0238208 A1    Aug. 1, 2019

Related U.S. Application Data

(60) Provisional application No. 62/654,924, filed on Apr. 9, 2018, provisional application No. 62/656,078, filed
(Continued)

(51) Int. Cl.
*H04B 7/06* (2006.01)
*H04W 72/04* (2009.01)
(Continued)

(52) U.S. Cl.
CPC .......... *H04B 7/0695* (2013.01); *H04W 24/08* (2013.01); *H04W 24/10* (2013.01); *H04W 72/0446* (2013.01)

(58) Field of Classification Search
CPC .. H04B 7/0617; H04B 7/0619; H04B 7/0695; H04B 7/0802; H04B 7/084;
(Continued)

(56) References Cited

U.S. PATENT DOCUMENTS

2017/0195215 A1 * 7/2017 Gomadam ........... H04B 7/0695
2018/0199212 A1 * 7/2018 Lin ....................... H04B 7/088
(Continued)

FOREIGN PATENT DOCUMENTS

WO   WO-2019066624 A1 * 4/2019 ............ H04B 7/06

*Primary Examiner* — Paul H Masur
(74) *Attorney, Agent, or Firm* — Kowert, Hood, Munyon, Rankin & Goetzel, P.C.

(57) ABSTRACT

Embodiments of a User Equipment (UE), Next Generation Node-B (gNB) and methods of communication are generally described herein. The UE receive training signals from a plurality of transmit-receive points (TRPs) associated with the gNB. Each training signal may comprise a reference signal resource identifier (ID) to indicate a corresponding TRP and a corresponding transmit direction of a plurality of transmit directions. The UE may, for each transmit direction of the plurality of transmit directions, determine an average signal quality measurement based on individual signal quality measurements in multiple receive directions. The UE may select, for reporting to the gNB, a subset of the average signal quality measurements to ensure that the average signal quality measurements excluded from the subset are less than or equal to a minimum value of the average signal quality measurements in the subset.

20 Claims, 10 Drawing Sheets

Related U.S. Application Data on Apr. 11, 2018, provisional application No. 62/669,511, filed on May 10, 2018, provisional application No. 62/669,668, filed on May 10, 2018, provisional application No. 62/674,323, filed on May 21, 2018.

(51) Int. Cl.
*H04W 24/10* (2009.01)
*H04W 24/08* (2009.01)

(58) Field of Classification Search
CPC .. H04B 7/0842; H04B 7/0848; H04B 7/0851; H04W 24/08; H04W 24/10; H04W 72/0446; H04W 72/046
See application file for complete search history.

(56) References Cited

U.S. PATENT DOCUMENTS

2019/0305830 A1* 10/2019 Zhou ................ H04B 7/0697
2019/0320430 A1* 10/2019 Kim ................. H04W 74/0833

* cited by examiner

METHODS OF BEAM MANAGEMENT AND BEAM SELECTION BASED ON MEASUREMENT REPORTING IN NEW RADIO (NR) SYSTEMS

PRIORITY CLAIM

This application claims priority under 35 USC 119(e) to U.S. Provisional Patent Application Ser. No. 62/654,924, filed Apr. 9, 2018, and to U.S. Provisional Patent Application Ser. No. 62/656,078, filed Apr. 11, 2018, and to U.S. Provisional Patent Application Ser. No. 62/669,511, filed May 10, 2018, and to U.S. Provisional Patent Application Ser. No. 62/669,668, filed May 10, 2018, and to U.S. Provisional Patent Application Ser. No. 62/674,323, filed May 21, 2018, all of which are incorporated herein by reference in their entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to beam management and beam selection. Some embodiments relate to transmit-receive points (TRPs).

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
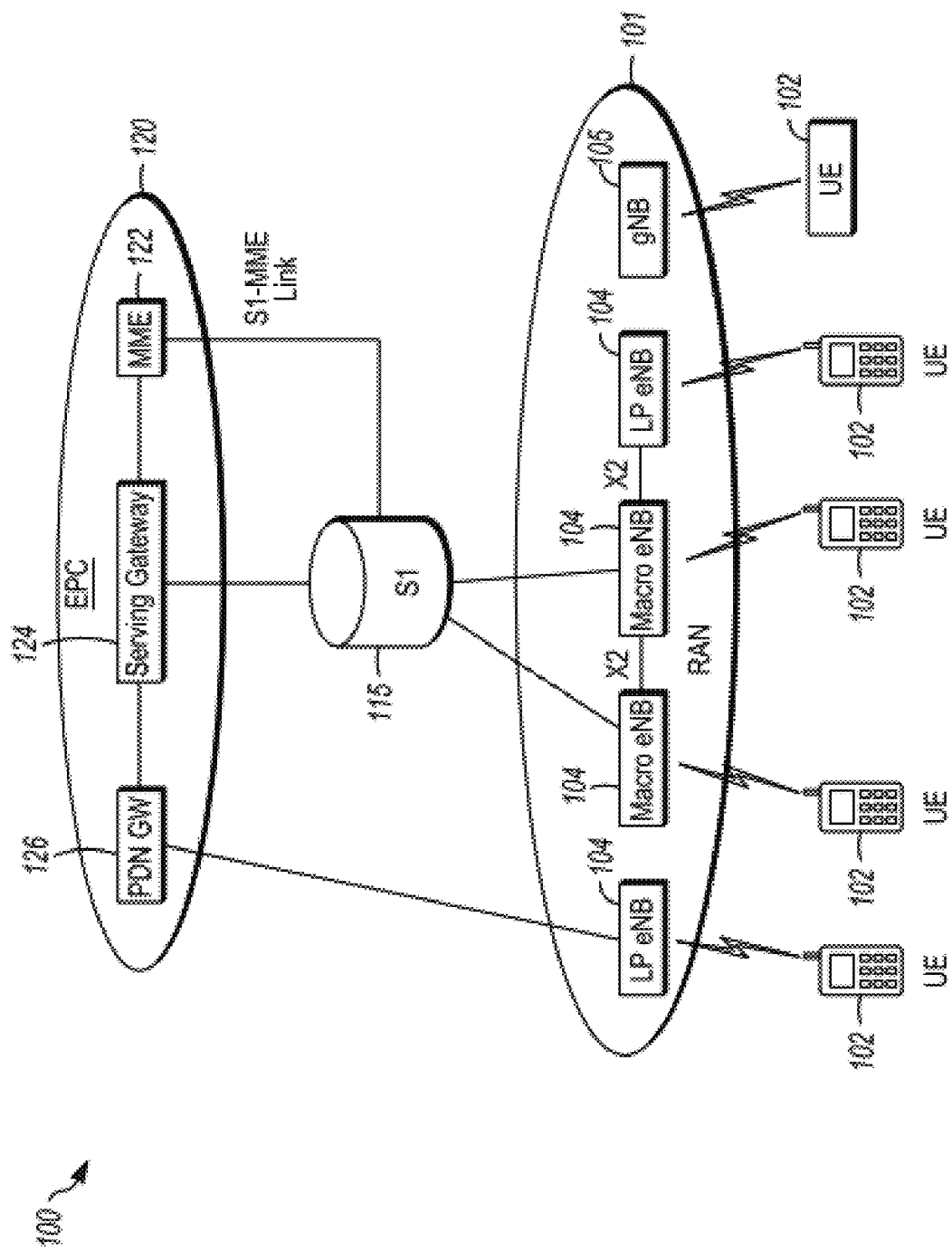
FIG. 1A is a functional diagram of an example network in accordance with some embodiments.
Figure 1B:
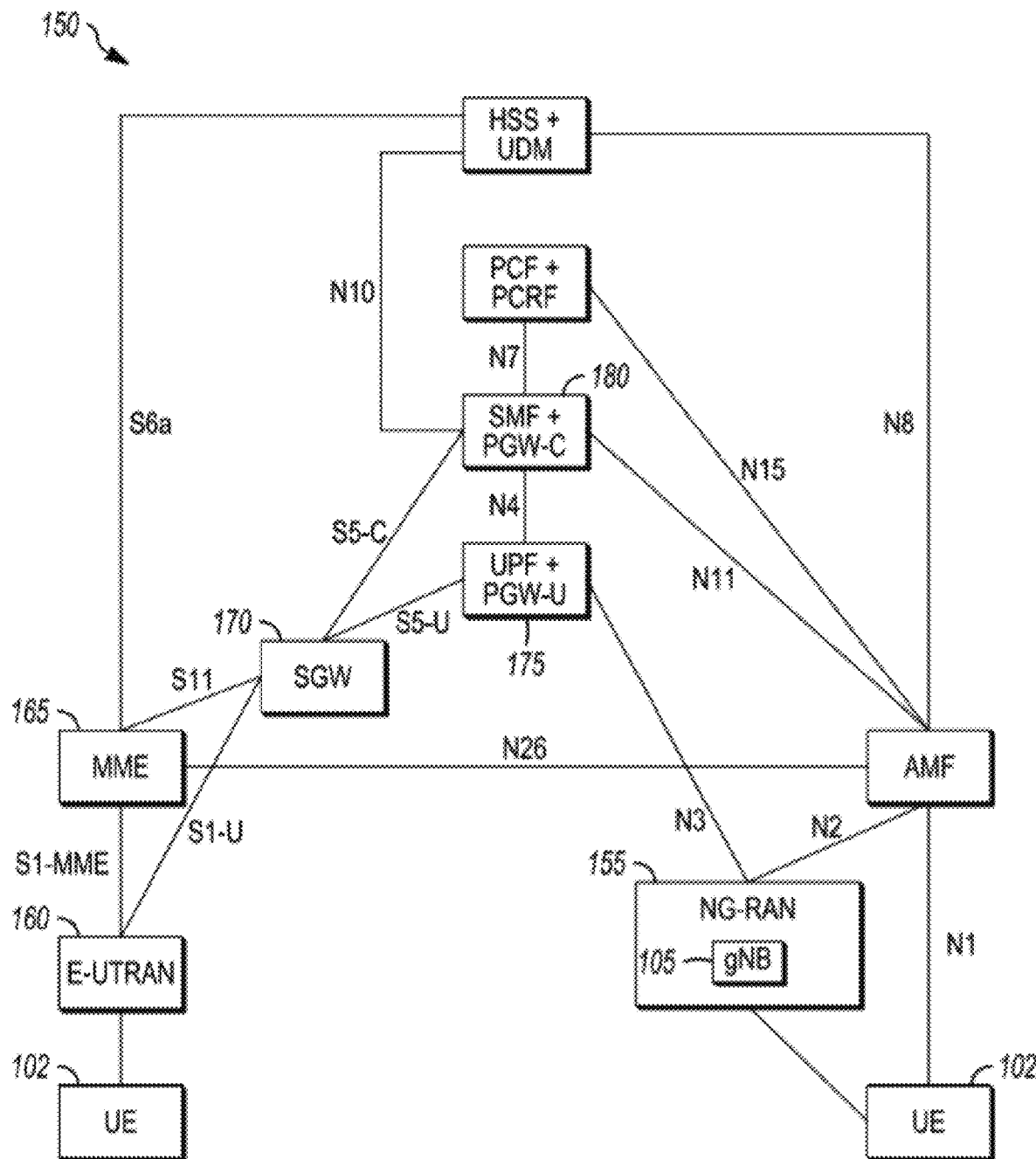
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
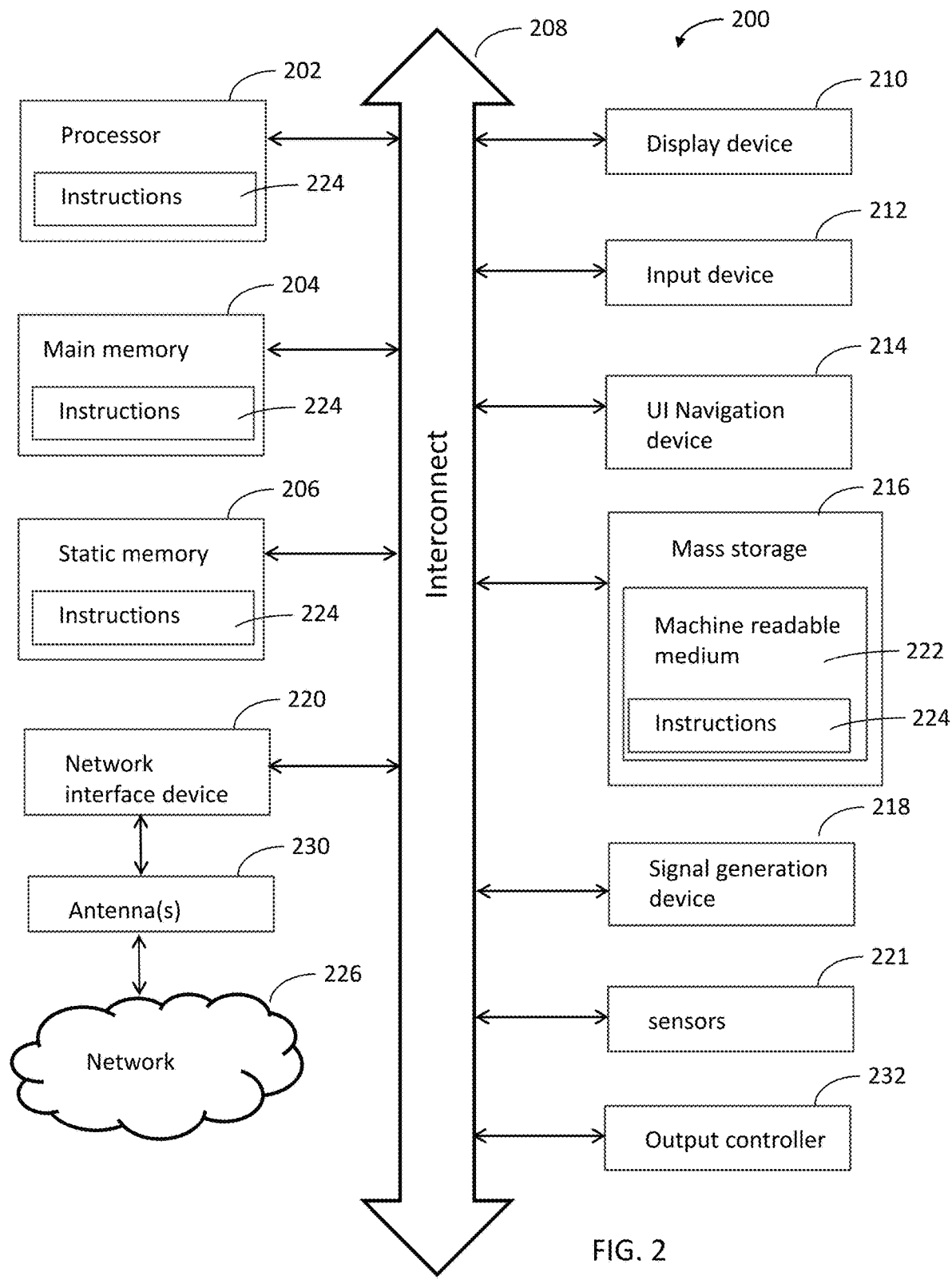
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
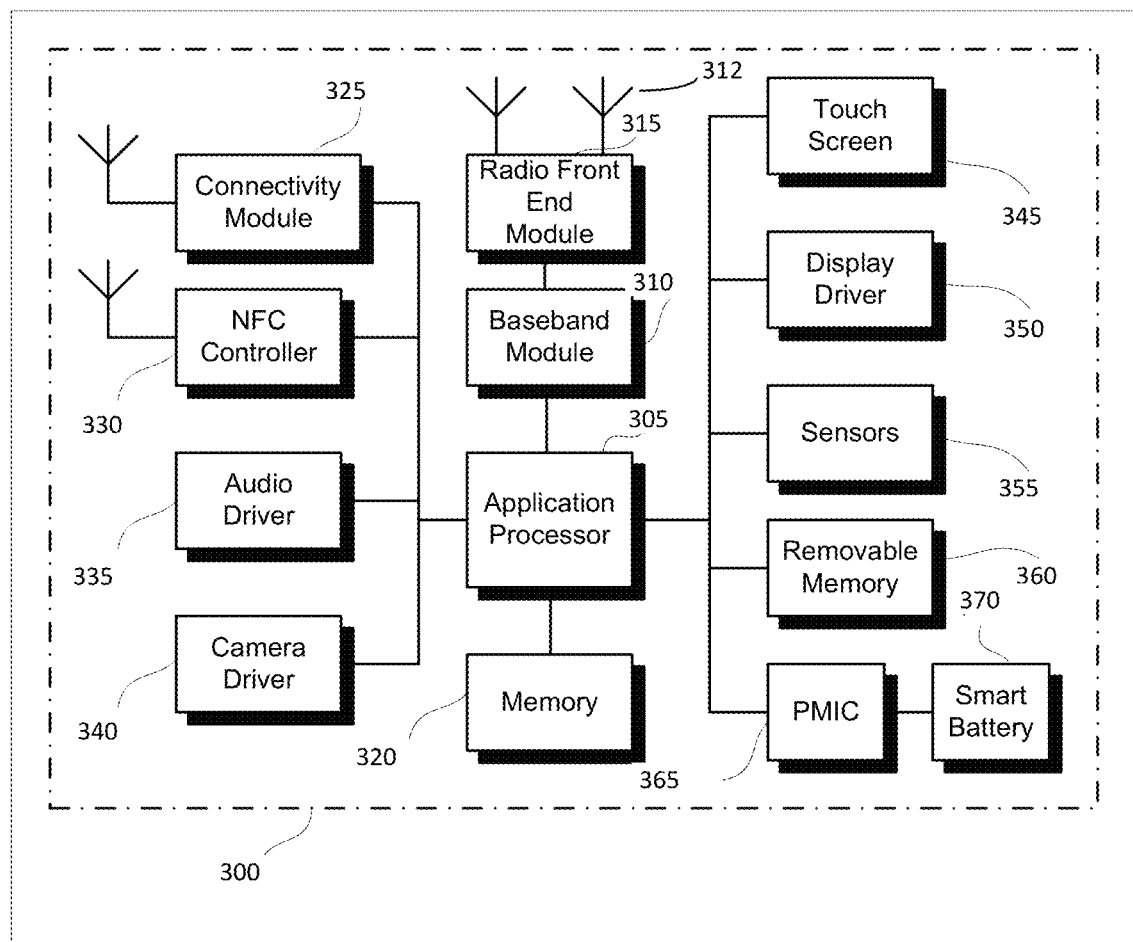
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (10), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
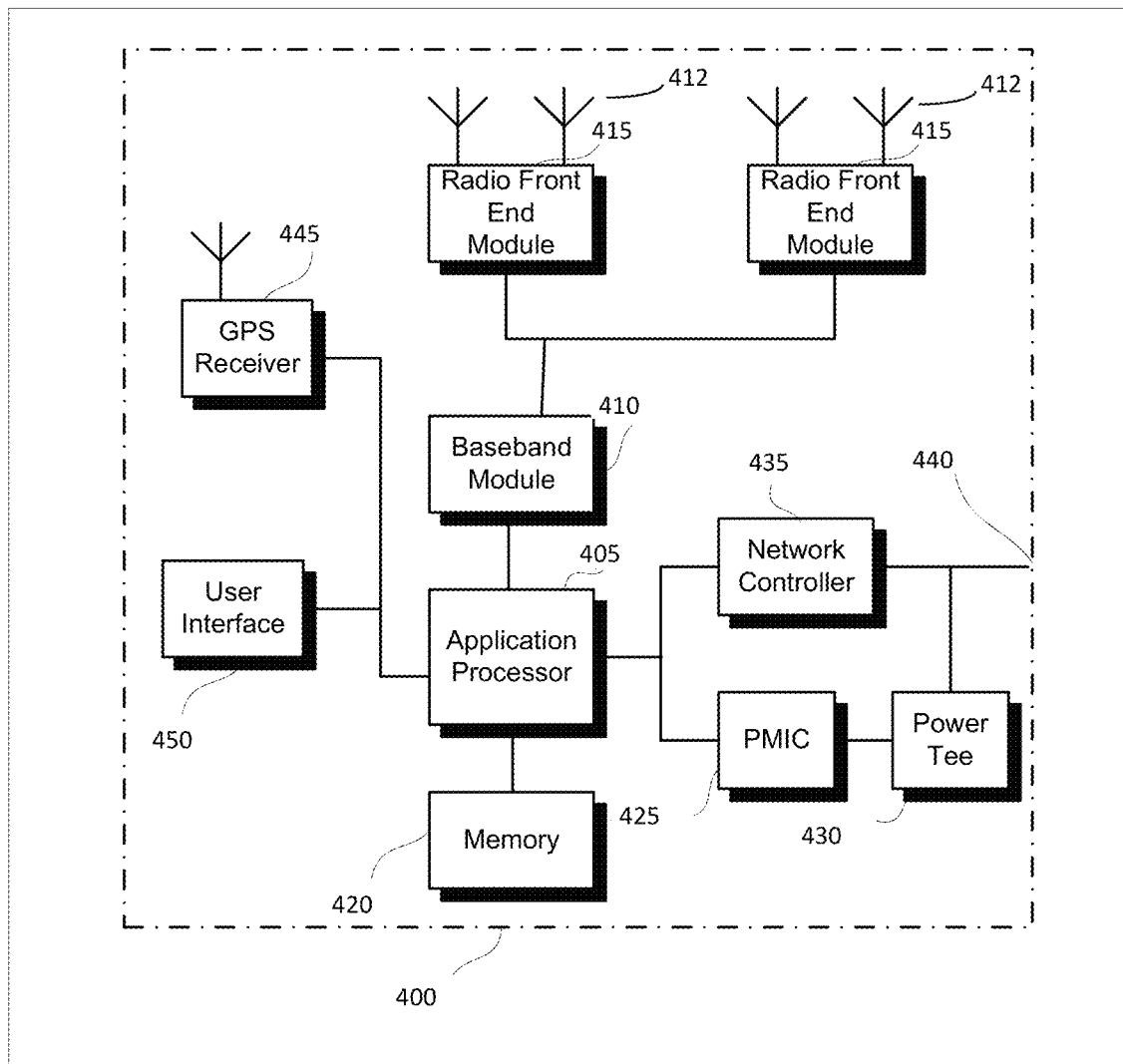
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
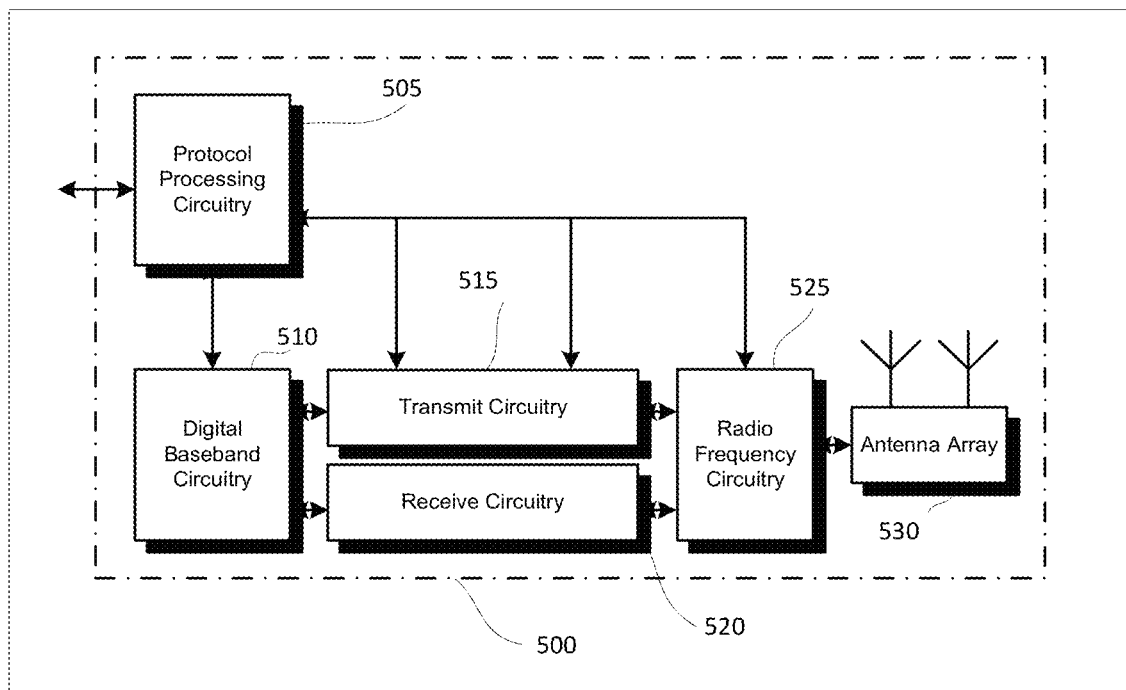
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
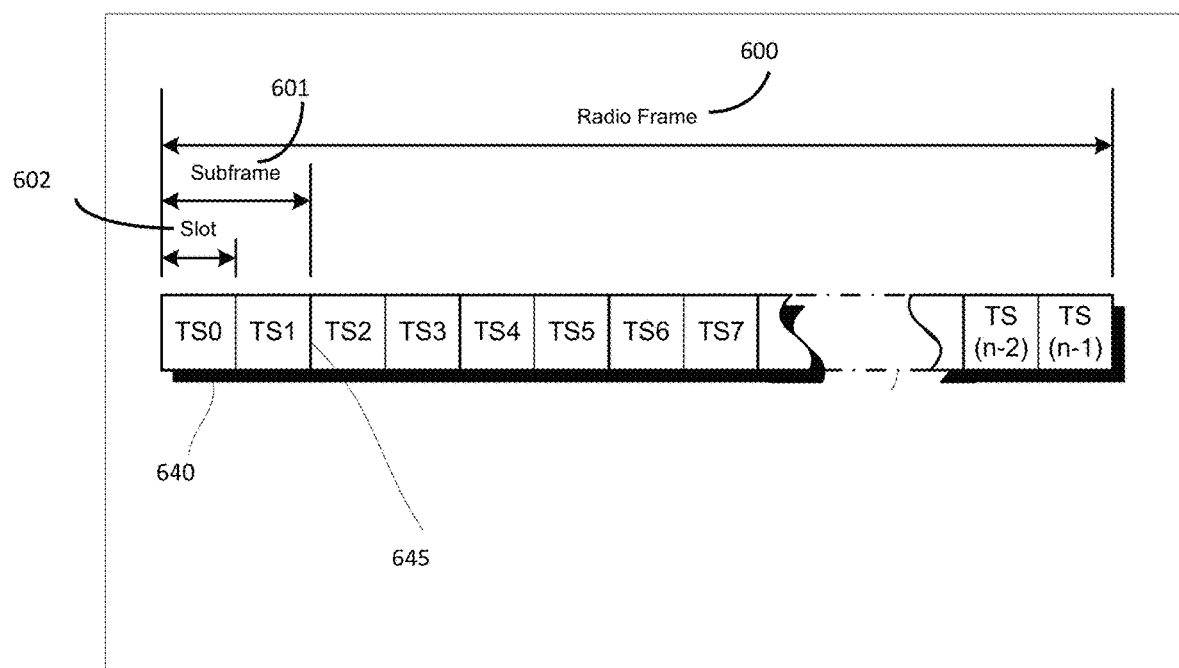
FIG. 6 illustrates an example of a radio frame structure in accordance with some embodiments.
Figures 7A, 7B:
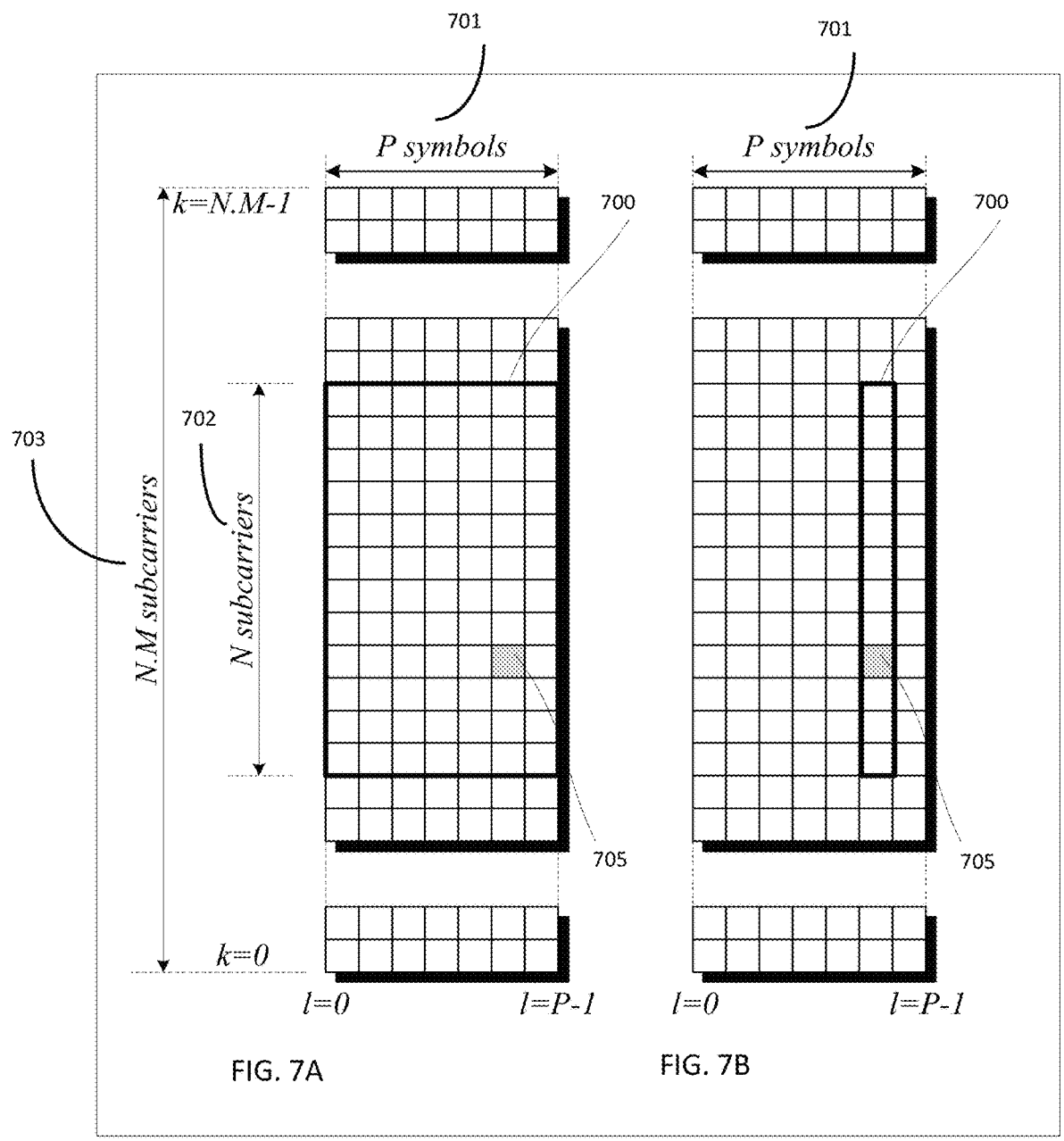
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, a UE 102 may be configured for beam management and beam selection in a new radio (NR) network. The UE 102 may decode signaling to configure the UE 102 for beam measurement reporting. The UE 102 may receive training signals from a plurality of transmit-receive points (TRPs) associated with a gNB 105. The training signals may be received in time slots. Each training signal may comprise a reference signal resource identifier (ID) to indicate a corresponding TRP and a corresponding transmit direction of a plurality of transmit directions. The UE 102 may, for each transmit direction of the plurality of transmit directions, and for each receive direction of the plurality of receive directions: decode the reference signal resource ID associated with the transmit direction; and determine an individual signal quality measurement based on reception, in the receive direction, of the training signal associated with the transmit direction during one of the time slots. The UE 102 may, for each transmit direction of the plurality of transmit directions, generate an average signal quality measurement for the transmit direction based on the individual signal quality measurements for the plurality of receive directions. The UE 102 may select, for reporting to the gNB 105, a subset of the average signal quality measurements for the plurality of transmit directions. The subset of the average signal quality measurements may be of a predetermined size. The subset may be selected to ensure that the average signal quality measurements excluded from the subset are less than or equal to a minimum value of the average signal quality measurements in the subset. These embodiments are described in more detail below.

Figure 8:
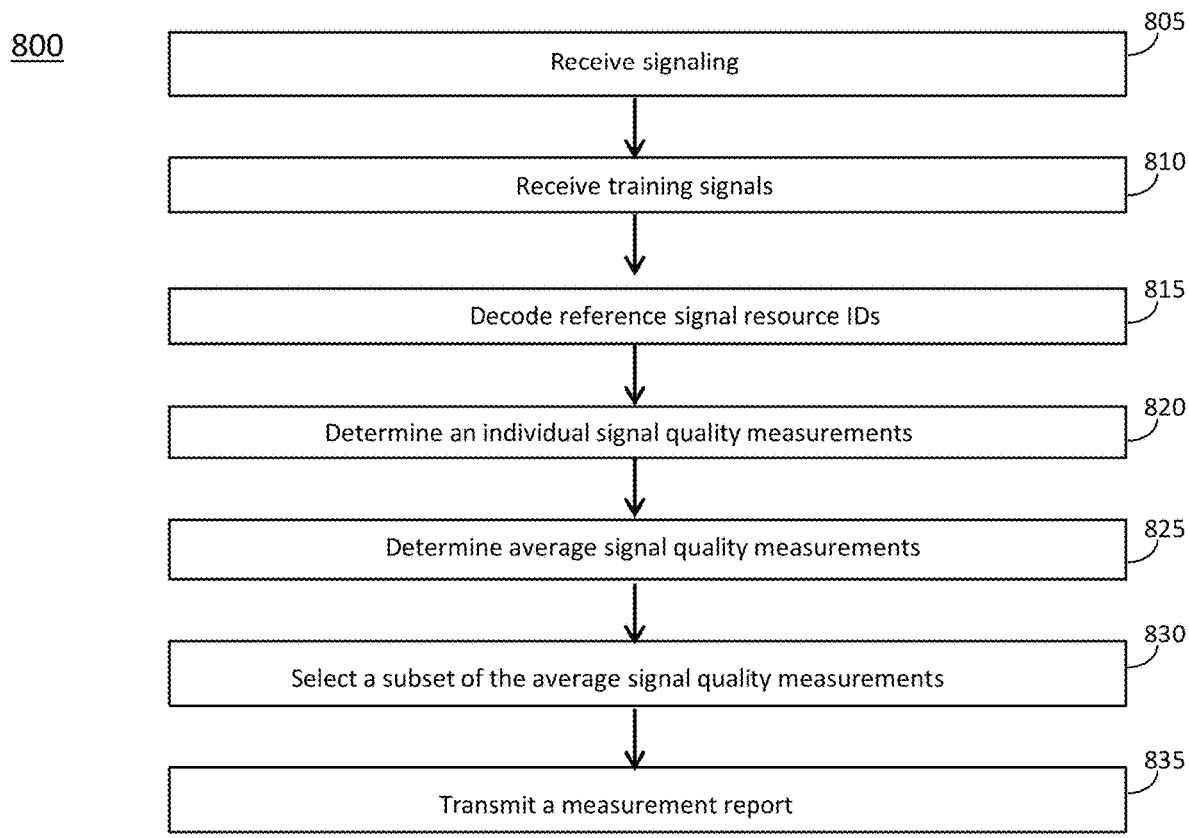
FIG. 8 illustrates the operation of a method of communication in accordance with some embodiments.
Figure 9:
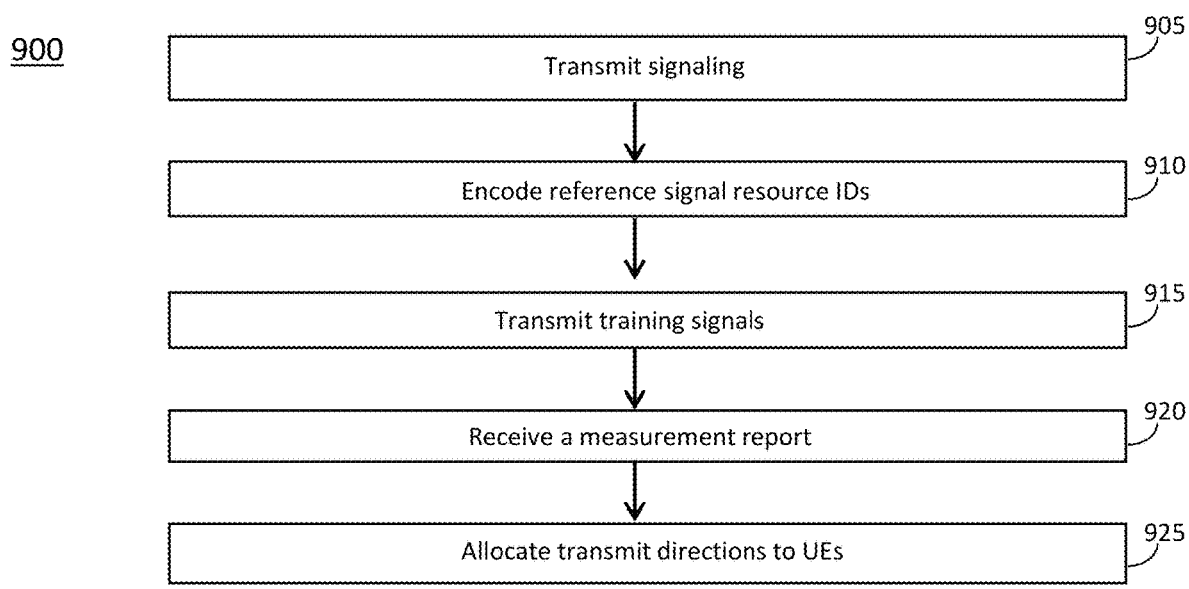
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 900, in some embodiments. In another non-limiting example, the eNB 104 may perform an operation that may be the same as, similar to, reciprocal to and/or related to an operation of the method 900, in some embodiments It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various operations, techniques and/or concepts regarding one of the methods 800, 900 and/or other method may be applicable to one of the other methods, although the scope of embodiments is not limited in this respect. Such operations, techniques and/or concepts may be related to TRPs, transmit directions, receive directions, transmit beams, receive beams, measurement reporting, and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. Embodiments are not limited to usage of those elements, however. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102 may be configured for beam management and beam selection in an NR network, although the scope of embodiments is not limited in this respect. In some embodiments, the UE 102 may be arranged to operate in accordance with an NR protocol. In some embodiments, the gNB 105 may be configured for beam management and beam selection in an NR network, although the scope of embodiments is not limited in this respect. In some embodiments, the gNB 105 may be arranged to operate in accordance with an NR protocol.

At operation 805, the UE 102 may receive signaling, including but not limited to control signaling. In some embodiments, the UE 102 may receive the signaling and/or control signaling from the gNB 105, although the scope of embodiments is not limited in this respect. It should be noted that the UE 102 may receive multiple instances of signaling and/or control signaling. For instance, the UE 102 may receive first signaling and/or control signaling from the gNB 105 and may receive second signaling and/or control signaling from the gNB 105. In some embodiments, the UE 102 may perform one or more operations after reception of the first signaling and/or control signaling and before reception of the second signaling and/or control signaling. The example of two instances of signaling and/or control signaling (first and second) may be extended to include any number of instances of signaling and/or control signaling.

In some embodiments, the signaling and/or control signaling may include parameters, information and/or other elements related to one or more of: beam management, beam selection, transmit direction(s), receive direction(s), TRPs, signal quality measurements, measurement reports, training signals, reference signal resource IDs, time resources for training signals and/or other signals, frequency resources for training signals and/or other signals, and/or other.

At operation 810, the UE 102 may receive training signals. In some embodiments, the UE 102 may receive one or more of the training signals from the gNB 105, although the scope of embodiments is not limited in this respect. In some embodiments, the UE 102 may receive one or more of the training signals from one or more TRPs, although the scope of embodiments is not limited in this respect.

In some embodiments, the training signals may include one or more of: a synchronization signal block (SSB); a physical broadcast channel (PBCH); a primary synchronization signal (PSS); a secondary synchronization signal (SSS); a channel state information reference signal (CSI-RS); a demodulation reference signal (DM-RS); a phase tracking reference signal (PT-RS); and/or other.

At operation 815, the UE 102 may decode reference signal resource IDs. At operation 820, the UE 102 may determine one or more individual signal quality measurements. At operation 825, the UE 102 may determine one or more average signal quality measurements. At operation 830, the UE 102 may select a subset of the average signal quality measurements. At operation 835, the UE 102 may transmit a measurement report. In some embodiments, the UE 102 may transmit the measurement report to the gNB 105, although the scope of embodiments is not limited in this respect.

In some embodiments, the UE 102 may receive signaling to configure the UE 102 for beam measurement reporting. In some embodiments, the UE 102 may receive training signals from a plurality of transmit-receive points (TRPs) associated with the gNB 105. In some embodiments, the training signals may be received in time slots. In some embodiments, each training signal may comprise a reference signal resource identifier (ID) to indicate a corresponding TRP and a corresponding transmit direction of a plurality of transmit directions. In some embodiments, the UE 102 may receive signaling that indicates the reference signal IDs corresponding to the transmit directions of the plurality of transmit directions.

In some embodiments, the UE 102 may receive signaling that configures the UE to receive the training signals from transmit directions between the UE and at least two TRPs.

In some embodiments, the UE 102 may, for each transmit direction of the plurality of transmit directions, and for each receive direction of the plurality of receive directions: decode the reference signal resource ID associated with the transmit direction; and determine an individual signal quality measurement based on reception, in the receive direction, of the training signal associated with the transmit direction during one of the time slots. For each transmit direction of the plurality, the UE 102 may generate an average signal quality measurement for the transmit direction based on corresponding individual signal quality measurements for the transmit direction for the plurality of receive directions.

In some embodiments, for one of the transmit directions, the UE 102 may determine a set of individual signal quality measurements (which may be based on reception in the plurality of receive directions of training signals transmitted by the gNB 105 in the transmit direction). The UE 102 may determine an average signal quality measurement based on the set of individual signal quality measurements. The UE 102 may repeat the above technique (and/or similar technique) to generate an average signal quality measurement for each of the transmit directions.

In some embodiments, the individual signal quality measurements may be based on one or more of: reference signal received powers (RSRPs); L1-RSRPs; signal-to-noise ratio (SNR); signal-to-interference plus noise ratio (SINR); and/or other.

In some embodiments, the UE 102 may select, for reporting to the gNB 105, a subset of the average signal quality measurements for the plurality of transmit directions. In some embodiments, the subset of the average signal quality measurements may be of a predetermined size. In some embodiments, the subset may be selected to ensure that the average signal quality measurements excluded from the subset are less than or equal to a minimum value of the average signal quality measurements in the subset. For instance, for a parameter N (which may be less than or equal to the number of transmit directions), the UE 102 may select the best N average signal quality measurements. Determination of the best N measurements may include selection of the highest N measurements within the set, in some embodiments.

In some embodiments, the UE 102 may generate a measurement report for transmission to the gNB 105. The measurement report may indicate one or more of: the average signal quality measurements of the subset; the reference signal resource IDs of the transmit directions corresponding to the average signal quality measurements of the subset; and/or other.

In some embodiments, for each transmit direction of the plurality of transmit directions, and for each receive direction of the plurality of receive directions: the reception, in the receive direction, of the training signals associated with the transmit direction may be performed during a time slot allocated for the transmit direction.

In some embodiments, the UE 102 may, in each transmit direction of the plurality of transmit directions, for each receive direction of the plurality of receive directions: determine multiple individual signal quality measurements based on reception, in the receive direction, of multiple training signals associated with the transmit direction during multiple time slots. In some embodiments, the UE 102 may decode control signaling that configures the multiple time slots as a plurality of periodic time slots.

In some embodiments, the UE 102 may, for each transmit direction of the plurality of transmit directions, determine the average signal quality measurement based on an average of a subset of the individual signal quality measurements for the transmit direction. In some embodiments, the subset of the individual signal quality measurements may be of a predetermined size. In some embodiments, the subset may be selected to ensure that the individual signal quality measurements excluded from the subset are less than or equal to a minimum value of the individual signal quality measurements for the transmit direction. For instance, for a parameter M1 (which may be less than or equal to the number of received directions), the UE 102 may determine the average signal quality measurement for one of the transmit directions based on the best M1 individual signal quality measurements for the transmit directions. Determination of the best M1 measurements may include selection of the highest M1 measurements within the set, in some embodiments. The UE 102 may perform the above for each of the transmit directions, in some embodiments.

In some embodiments, the UE 102 may receive, from the gNB 105, signaling that indicates, from the transmit directions indicated in the measurement report, one of the transmit directions for downlink transmission to the UE 102. The UE 102 may determine, based on the individual signal quality measurements corresponding to the transmit direction for downlink transmission, one of the receive directions to be used by the UE 102 for reception of the downlink data. For instance, the UE 102 may have determined a set of individual signal quality measurements for the transmit direction to be used for reception of the downlink data (as indicated in the measurement report). The UE 102 may identify the receive direction, of the set, for which the individual signal quality measurement is maximum, and may receive downlink data in accordance with that receive direction.

In some embodiments, an apparatus of a UE 102 may comprise memory. The memory may be configurable to store information related to the individual signal quality measurements and the average signal quality measurements. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to determination of the determination of the individual signal quality measurements and the average signal quality measurements. The apparatus may include a transceiver to receive the training signals. The transceiver may transmit and/or receive other blocks, messages and/or other elements.

At operation 905, the gNB 105 may transmit signaling and/or control signaling. At operation 910, the gNB 105 may encode reference signal resource IDs. At operation 915, the gNB 105 may transmit training signals. At operation 920, the gNB 105 may receive a measurement report. At operation 925, the UE 102 may allocate transmit directions to UEs 102.

In some embodiments, the gNB 105 may be configured for beam management and beam selection in an NR network. In some embodiments, the gNB 105 may be coupled to one or more TRPs.

In some embodiments, the gNB 105 may transmit signaling to configure a plurality of UEs 102 for beam measurement reporting based on training signals from the TRPs. In some embodiments, the gNB 105 may transmit signaling to configure the TRPs to transmit the training signals in time slots. In some embodiments, each training signal may comprise a reference signal resource identifier (ID) to indicate a corresponding TRP and a corresponding transmit direction of a plurality of transmit directions. In some embodiments, for the signaling that configures the TRPs to transmit the training signals, the gNB 105 may encode the signaling to configure at least one of the TRPs for transmission in multiple transmit directions. In some embodiments, at least some of the transmit directions may be based on directions that originate from the TRPs.

In some embodiments, the gNB 105 may receive, from each of the plurality of UEs 102, a measurement report that indicates reference signals IDs of a subset of the plurality of transmit directions and corresponding average signal quality measurements. In some embodiments, the gNB 105 may determine, based on the measurement reports, a transmit direction of the plurality of transmit directions to be used for downlink communication with each of the plurality of UEs 102.

In some embodiments, the gNB 105 may, for each of the plurality of UEs 102, determine a best transmit direction as the transmit direction for which the corresponding average signal quality measurement in the measurement report from the UE 102 is maximum. In some embodiments, the gNB 105 may allocate one of the transmit directions of the plurality of transmit directions to each of the UEs 102 based on the best transmit directions of the UEs 102. In a non-limiting example, for a transmit direction that is determined to be the best transmit direction of two of the UEs 102, the transmit direction may be allocated to the UE 102 of the two UEs 102 for which the corresponding average signal quality measurement of the transmit direction is maximum. This example may be extended to include one or more additional rules and/or guidelines; one or more similar rules and/or guidelines; one or more alternate rules and/or guidelines; one or more additional rules and/or guidelines; and/or other, in some embodiments.

In some embodiments, an apparatus of a gNB 105 may comprise memory. The memory may be configurable to store information related to the measurement report. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding of the measurement report. The apparatus may include a transceiver to receive the measurement report. The transceiver may transmit and/or receive other blocks, messages and/or other elements.

In some discussions herein, the "receiver" may refer to the UE 102 and the "transmitter" may refer to the gNB 105. The scope of embodiments is not limited in this respect, however.

In some embodiments, pairing of transmitter beams and receiver beams may be performed (such as beam management and/or beam selection). Various aspects may be considered, including but not limited to time delay, robustness, accuracy, and/or other.

In NR, there may be multiple transmitter beams (Tx beams) for signal transmission and multiple receiver beams (Rx beams) for signal reception. Different Tx/Rx beams may point to different transmission/reception directions.

In some embodiments, beam management and/or beam selection may include measurement and reporting of IDs (Tx beam associated) from the receiver side. For multiple time slots, with transmission using the same Tx beam, the receiver can try/test different Rx beams for reference signal reception in different time slots, and calculate, for example, the RSRP based on the received signal(s). In some embodiments, reception may be performed in each individual single time slot using an individual Rx beam. In some embodiments, reception may be performed in multiple time slots (K time slots, with K>1) with a same Rx beam in each of those time slots, and averaging of measurements for the K samples may be performed. In some embodiments, reception may be performed in multiple time slots (M time slots, with M>1) with a different Rx beam in of those time slots. Averaging over the best M1 samples (with M1≤M) may be performed. In some embodiments, reception may be performed in M×K time slots to accommodate M Rx beams, with each of those Rx beams used over K time slots. Averaging over the whole set of M×K samples or averaging over a subset of the M×K samples may be performed.

In some embodiments, based on one or more measurements, one or more averages of measurements and/or other, the receiver may select the N reference signal resource IDs (with N≥1) that are associated with N Tx beams and report them to the transmitter side. One criterion can be based on the resource IDs that obtain the N highest RSRP values. For instance, the receiver may select the N highest RSRP values, and may report the corresponding N Tx beams (such as reporting of IDs that are mapped to those Tx beams).

In some embodiments, the receiver may measure different pairs of Tx/Rx beams over a single transmission slot or over multiple slots. This may offer the opportunity to perform averaging over multiple slots for the same Rx beam, or averaging over multiple Rx beams in multiple slots. In some cases, the averaging operation may improve the robustness of signal reception, which, in turn, may improve the overall NR-capable receiver performance.

In NR, there are multiple transmitter beams (Tx beams) for signal transmission and multiple receiver beams (Rx beams) for signal reception. It can be understood that different Tx/Rx beams may point to different transmission/reception directions. In one scenario in a line-of-sight channel, the transmitter may select the Tx beam pointing exactly to the receiver for signal transmission; while, the receiver may select the Rx beam pointing exactly to the transmitter for signal reception. In order to build a good communication link (i.e. find a good pair of Tx/Rx beams), the transmitter and receiver may perform beam sweeping to determine which beam(s) are good candidate(s) for signal transmission/reception. One way is that, for each individual Tx beam, the transmitter periodically or aperiodically transmits reference signals (a signal that is also known at the receiver side) using/trying the same or different Tx beams. In NR, these reference signals may include, but are not limited to, one or more of: channel state information reference signal (CSI-RS), synchronization signal (SSB), PBCH block, primary synchronization signal (PSS), secondary synchronization signal (SSS), demodulation reference signal (DM-RS), phase tracking reference signal (PT-RS) and/or other.

And, at the receiver side, different Rx beams may be tested. One goal may be to find the best N pair(s) of Tx/Rx beams (N≥1). One criterion for the beam selection can be based on the reference signal received power (RSRP). Other criteria are also possible, such as SINR values.

In some embodiments, a reference signal carried by a Tx beam may be assigned a reference signal resource ID. In some embodiments, one reference signal resource ID will be associated with one Tx beam, although the scope of embodiments is not limited in this respect. Once the receiver decides the best N pairs of Tx/Rx beams (N≥1), it may report the corresponding N ID(s) to the transmitter. In some embodiments, the receiver may report the corresponding N ID(s) to the transmitter let the transmitter know which Tx beam(s) are suitable for transmission, although the scope of embodiments is not limited in this respect. In some embodiments, the receiver may report the corresponding N ID(s) to the transmitter let the transmitter know which Tx beam(s) were selected by the UE 102, although the scope of embodiments is not limited in this respect.

In some embodiments, beam management and beam selection may include performance of measurement(s) at the receiver and/or reporting of Tx beam associated ID(s) from the receiver side. In some embodiments, for multiple time slots transmission using the same Tx beam, the receiver can try/test different Rx beams for reference signal reception in different time slots, and calculate, for example, the RSRP based on one or more of: the received signal(s) in each individual single time slot using an individual Rx beam; the received signal(s) in multiple K (K>1) time slots and each time slots using the same individual Rx beam, and then averaging over the K samples; the received signal(s) in multiple M (M>1) time slots and each time slots using a different individual Rx beam, and then averaging over the best M1 (M1≤M) samples; the received signal(s) in multiple M×K time slots to accommodate M Rx beams and each Rx beam is used over K time slots, and then perform averaging over the whole or a subset of M×K samples; and/or other. After the single-time-slot-based and/or averaging-over-multiple-time-slot-based operation, the receiver may select the N (N≥1) reference signal resource IDs, which are associated with N Tx beams and report them to the transmitter side. One criterion can be based on the resource IDs that obtain the N highest RSRP values, although the scope of embodiments is not limited in this respect.

In some embodiments, in NR, beam management resources can be based on CSI-RS, SSB or others based L1-RSRP measurement. In case of mmWave, e.g. FR2, in order to derive L1-RSRP, Rx beam sweeping may be used to identify the good pair(s) of Tx and Rx beam. In this case, the UE 102 may determine how many Rx beams are used to measure L1-RSRP. For the same beam management resources, e.g. the resources with the same CRI (CSI-RS Resource Indicator) or different CRI but QCL, the UE 102 may sweep Rx beams and obtain L1-RSRP measurement for each individual Rx beam. Then, the L1-RSRP corresponding to each individual Rx beam can be derived either based on single slot measurement or multiple slots measurements (e.g. averaging the measurement cross multiple slots). In some embodiments, the UE 102 may derive the L1-RSRP for a specific beam management resource based on the best L1-RSRP among all L1-RSRP associated with each individual Rx beam. In some embodiments, the UE 102 may derive the L1-RSRP for a specific beam management resource based on the average of best-M L1-RSRP among all L1-RSRP associated with each individual Rx beam, where M can be the value from 1 to the total number of Rx beams. In some embodiments, the UE 102 may derive the L1-RSRP for a specific beam management resource based on the average of all L1-RSRP associated with each individual Rx beam.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE) configured for beam management and beam selection in a new radio (NR) network, the apparatus comprising:
   memory; and processing circuitry, configured to: decode signaling to configure the UE for beam measurement reporting,
   wherein for the beam measurement reporting, the processing circuitry is to configure the UE to:
   receive training signals from a plurality of transmit-receive points (TRPs) associated with a next-Generation node B (gNB), the training signals received in time slots, each training signal comprising a reference signal resource identifier (ID) to indicate a corresponding TRP and a corresponding transmit direction of a plurality of transmit directions;
   for each transmit direction of the plurality:
      for each receive direction of the plurality:
         decode the reference signal resource ID associated with the transmit direction; and
         determine an individual signal quality measurement based on reception, in the receive direction, of the training signal associated with the transmit direction during one of the time slots;
      generate an average signal quality measurement for the transmit direction based on the individual signal quality measurements for the plurality of receive directions;
   select, for reporting to the gNB, a subset of the average signal quality measurements for the plurality of transmit directions,
   wherein average signal quality measurements that are less than or equal to a minimum value of the average signal quality measurements are excluded from the subset.

2. The apparatus according to claim 1, wherein the subset of the average signal quality measurements is of a predetermined size, and
   wherein the processing circuitry further configured to:
   generate a measurement report for transmission to the gNB, wherein the measurement report indicates:
      the average signal quality measurements of the subset, and
      the reference signal resource IDs of the transmit directions corresponding to the average signal quality measurements of the subset.

3. The apparatus according to claim 1, wherein:
   for each transmit direction of the plurality of transmit directions:
      for each receive direction of the plurality of receive directions:
         the reception, in the receive direction, of the training signals associated with the transmit direction is performed during a time slot allocated for the transmit direction.

4. The apparatus according to claim 1, the processing circuitry further configured to:
   for each transmit direction of the plurality of transmit directions:
      for each receive direction of the plurality of receive directions:
         determine multiple individual signal quality measurements based on reception, in the receive direction, of multiple training signals associated with the transmit direction during multiple time slots.

5. The apparatus according to claim 4, the processing circuitry further configured to:
   decode signaling that configures the multiple time slots as a plurality of periodic time slots.

6. The apparatus according to claim 1, the processing circuitry further configured to:
   for each transmit direction of the plurality of transmit directions:

determine the average signal quality measurement based on an average of a subset of the individual signal quality measurements for the transmit direction, wherein the subset of the individual signal quality measurements is of a predetermined size, wherein the subset is selected to ensure that the individual signal quality measurements excluded from the subset are less than or equal to a minimum value of the individual signal quality measurements for the transmit direction.

7. The apparatus according to claim 1, the processing circuitry further configured to:

decode signaling that configures the UE to receive the training signals from transmit directions between the UE and at least two transmit-receive points (TRPs).

8. The apparatus according to claim 1, the processing circuitry further configured to:

decode, from the gNB, signaling that indicates, from the transmit directions indicated in the measurement report, one of the transmit directions for downlink transmission to the UE; and determine, based on the individual signal quality measurements corresponding to the transmit direction for downlink transmission, one of the receive directions to be used by the UE for reception of the downlink data.

9. The apparatus according to claim 1, the processing circuitry further configured to:

decode signaling that indicates the reference signal IDs corresponding to the transmit directions of the plurality of transmit directions.

10. The apparatus according to claim 1, wherein the training signals include one or more of:

a synchronization signal block (SSB),
a physical broadcast channel (PBCH),
a primary synchronization signal (PSS), and
a secondary synchronization signal (SSS).

11. The apparatus according to claim 1, wherein the training signals include one or more of:

a channel state information reference signal (CSI-RS),
a demodulation reference signal (DM-RS), and
a phase tracking reference signal (PT-RS).

12. The apparatus according to claim 1, wherein the individual signal quality measurements are based on reference signal received powers (RSRPs).

13. The apparatus according to claim 1, wherein the UE is arranged to operate in accordance with a new radio (NR) protocol.

14. The apparatus according to claim 1, wherein:

the apparatus includes a transceiver to receive the training signals, the processing circuitry includes a baseband processor to determine the individual signal quality measurements and the average signal quality measurements, and the memory is configured to store information related to the individual signal quality measurements and the average signal quality measurements.

15. A non-transitory computer-readable storage medium that stores instructions for execution by processing circuitry of a Next Generation Node-B (gNB) configured for beam management and beam selection in a new radio (NR) network, the gNB coupled to one or more transmit-receive points (TRPs), the operations to configure the processing circuitry to:

encode signaling to configure a plurality of User Equipments (UEs) for beam measurement reporting based on training signals from the TRPs;

encode signaling to configure the TRPs to transmit the training signals in time slots, each training signal comprising a reference signal resource identifier (ID) to indicate a corresponding TRP and a corresponding transmit direction of a plurality of transmit directions;

decode, from each UE of the plurality, a measurement report that indicates reference signals IDs of a subset of the plurality of transmit directions and corresponding average signal quality measurements;

determine, based on the measurement reports, a transmit direction of the plurality of transmit directions to be used for downlink communication with each of the UEs.

16. The non-transitory computer-readable storage medium according to claim 15, the operations to further configure the processing circuitry to:

for each of the plurality of UEs, determine a best transmit direction as the transmit direction for which the corresponding average signal quality measurement in the measurement report from the UE is maximum;

allocate one of the transmit directions of the plurality of transmit directions to each of the UEs based on the best transmit directions of the UEs, wherein for a transmit direction that is determined to be the best transmit direction of two of the UEs, the transmit direction is allocated to the UE of the two UEs for which the corresponding average signal quality measurement of the transmit direction is maximum.

17. The non-transitory computer-readable storage medium according to claim 15, the operations to further configure the processing circuitry to:

for the signaling that configures the TRPs to transmit the training signals, encode the signaling to configure at least one of the TRPs for transmission in multiple transmit directions.

18. The non-transitory computer-readable storage medium according to claim 15, wherein at least some of the transmit directions are based on directions that originate from the TRPs.

19. An apparatus of a User Equipment (UE) configured for beam management and beam selection in a new radio (NR) network, the apparatus comprising: memory; and processing circuitry, configured to:

receive training signals from a plurality of transmit-receive points (TRPs) associated with a next-Generation node B (gNB), the training signals received in time slots, each training signal comprising a reference signal resource identifier (ID) to indicate a corresponding TRP and a corresponding transmit direction of a plurality of transmit directions;

for each transmit direction of the plurality of transmit directions:

for each receive direction of the plurality of receive directions:

decode the reference signal resource ID associated with the transmit direction; and determine an individual signal quality measurement based on reception, in the receive direction, of the training signal associated with the transmit direction during a time slot that is allocated for the transmit direction;

generate an average signal quality measurement for the transmit direction based on the individual signal quality measurements for the plurality of receive directions;

generate a measurement report for transmission to the gNB, wherein the measurement report indicates:

the average signal quality measurements of a subset of the average signal quality measurements, and the reference signal resource IDs of the transmit directions corresponding to the average signal quality measurements of the subset.

20. The apparatus according to claim 19, the processing circuitry further configured to:

select the subset of the average signal quality measurements for the plurality of transmit directions, wherein the subset of the average signal quality measurements is of a predetermined size, wherein the subset is selected to ensure that the average signal quality measurements excluded from the subset are less than or equal to a minimum value of the average signal quality measurements in the subset.

* * * * *